United States Patent [19]

Coates et al.

[11] Patent Number: 5,116,527
[45] Date of Patent: May 26, 1992

[54] DISPLAY ELEMENT BASED ON THE ELECTROCLINIC EFFECT

[75] Inventors: David Coates, Merley; Ian C. Sage, Broadstone, both of Great Britain; Thomas Geelhaar, Mainz; Andreas Wächtler, Griesheim, both of Fed. Rep. of Germany

[73] Assignee: Merck Patent Gesellschaftt Mit Beschränkter Haftung, Darmstadt, Fed. Rep. of Germany

[21] Appl. No.: 391,619

[22] PCT Filed: May 12, 1989

[86] PCT No.: PCT/EP89/00518
§ 371 Date: Jul. 27, 1989
§ 102(e) Date: Jul. 27, 1989

[87] PCT Pub. No.: WO89/11451
PCT Pub. Date: Nov. 30, 1989

[30] Foreign Application Priority Data

May 25, 1988 [GB] United Kingdom ............ 8812427.6

[51] Int. Cl.⁵ .................. C09K 19/52; G02F 1/00
[52] U.S. Cl. ........................... 252/299.61; 359/76; 359/104; 252/299.61; 252/299.63; 252/299.64; 252/299.65; 252/299.66; 252/299.67; 252/299.68

[58] Field of Search ............ 252/299.01, 299.1, 299.5, 252/299.61, 299.62, 299.63, 299.64, 299.65, 299.66, 299.67, 299.68; 350/350 R, 350 S; 359/76, 104

[56] References Cited

U.S. PATENT DOCUMENTS

| | | | |
|---|---|---|---|
| 4,725,688 | 2/1988 | Taguchi et al. | 544/298 |
| 4,753,752 | 6/1988 | Raynes et al. | 252/299.65 |
| 4,838,663 | 6/1989 | Lagerwall et al. | 350/350 S |
| 4,911,863 | 3/1990 | Sage et al. | 252/299.65 |
| 4,927,244 | 5/1990 | Bahr et al. | 350/350 S |
| 4,988,459 | 1/1991 | Scherowsky et al. | 252/299.61 |
| 4,997,591 | 3/1991 | Heppke et al. | 252/299.61 |

FOREIGN PATENT DOCUMENTS 0201341 11/1986 European Pat. Off. .
8602938 5/1986 World Int. Prop. O. .

OTHER PUBLICATIONS

Physical Review A, "Electroclinic Effect at the A-C Phase Change in a Chiral Ligand Crystal", vol. 19, No. 1, pp. 338-347, 1979.

Primary Examiner—Robert L. Stoll
Assistant Examiner—Shean C. Wu
Attorney, Agent, or Firm—Millen, White & Zelano

[57] ABSTRACT

The invention relates to a display element based on the electroclinic effect containing a liquid crystal medium being a mixture of at least two chiral components and at least one non-chiral component, characterized in that said medium has a pitch compensated cholesteric phase above the optically active smectic A phase.

11 Claims, No Drawings

DISPLAY ELEMENT BASED ON THE ELECTROCLINIC EFFECT

SUMMARY OF THE INVENTION

The invention relates to a display element based on the electroclinic effect containing a liquid crystal medium being a mixture of at least two chiral components and at least one non-chiral component, characterized in that said medium has a pitch compensated cholesteric phase above the optically active smectic A phase.

Ferroelectric smectics have recently entered the domain of liquid-crystal application in the so-called SSFLC (surface stabilized ferroelectric liquid crystal) device described by Clark and Lagerwall (N. A. Clark and S. T. Lagerwall, Appl. Phys. Lett. 36, 899 (1980); U.S. Pat. Specification No. 4,367,924).

This device utilizes the chiral smectic C phase or any chiral tilted smectic phase each of which has the characteristic of being ferroelectric.

The existence of a spontaneous polarization is possible only in chiral tilted smectic phases. However, in nontilted smectic phases, like smectic A, built up from chiral molecules one observes an induced tilt on applying an external electric field. Garoff and Meyer (S. Garoff and R. B. Meyer, Physical Review Letters 38, 848 (1977); Physical Review A 19, 338 (1979)) first described this so-called electroclinic effect (ECE).

The device they used shows only a small ECE and requires phase-sensitive methods for its detection.

Anderson et al. (G. Auderson et al., Appl. Phys. Lett. 51, 640 (1987); European Patent Application 0 263 225) describe a device having a geometry in which the samples are very thin and the smectic layers are perpendicular (instead of parallel) to the glass plates (this is the so-called bookshelf geometry typical of the SFLC-cells). In this device the ECE is detectable at conveniently low applied fields. This leads to an ECE which is also linear and gives a very fast response for a given substance.

Different compounds snowing an ECE are investigated by Nihiyama et al. (Jap. J. of Appl. Phys. 26, 1787 (1987)) or by Ch. Bahr and G. Heppke (Liquid Crystals, 1987, 825).

A great disadvantage for applications based on the electroclinic effect of the compounds currently available with smectic A phases is their low chemical, heat and light stability. Another adverse property of displays based on the ECE with compounds currently available is that they are difficult to align to an extent which is sufficient for practical application. But for many applications good alignment is vital although a smectic A phase does align over rubbed polymer (e.g. Patel, J. S., Leslie, T. M. and Goodby, J. W., Ferroelectrics 1984, 59, 137) and SiO, this process is much easier if a nematic phase precedes the smectic A phase.

The high cost of the chiral compounds used as single components in these displays is another disadvantage of the displays based on the ECE which are described until today.

Moreover, the temperature range of the smectic A phases showing an ECE is usually too small and is predominantly at temperatures being too high for commercial applications.

It now has been found that a display element based on the ECE with a liquid crystal medium which contains at least two chiral components and at least one non-chiral component and has a pitch compensated cholesteric phase above the optically active smectic A phase can substantially reduce the disadvantages mentioned.

Such a display element can particularly be used over a wide temperature range. The phases therein possess a high $P_s$ value and a compensated cholesteric phase which leads to a good alignment and a high induced tilt angle. $P_s$ is the spontaneous polarization in $nC/cm^2$. Furthermore the costs of such a display containing a mixture of chiral and non-chiral compounds is essentially lower than those of one containing only chiral compounds.

The invention thus relates to a display element based on the electroclinic effect containing a liquid crystal medium being a mixture of at least two chiral components and at least one non-chiral component, characterized in that said medium has a pitch compensated cholesteric phase above the optically active smectic A phase.

The invention furthermore relates to such a display element characterized in that at least one non-chiral component is a compound of the formula I

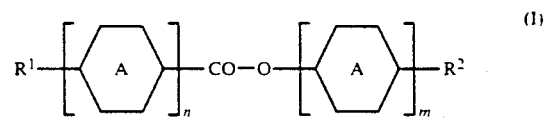

wherein
$R^1$ and $R^2$ are each independently an alkyl group with 5 to 15 C atoms wherein one or two non-adjacent $CH_2$ groups can also be replaced by —O—, —S—, —CO—O—, —O—CO— and /or —CH=CH—,

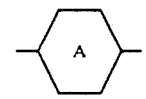

denotes a 1,4-phenylene group optionally substituted by fluorine and
n and m are each independently 1 or 2, and
at least one chiral component is a compound of the formula II

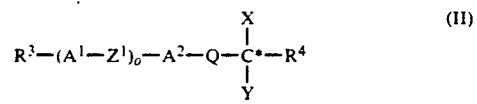

wherein
$R^3$ is an alkyl or alkenyl group each with 5 to 15 C atoms, optionally substituted by CN or at least one halogen atom wherein one or two non-adjacent $CH_2$ groups can be replaced by —O—, —CO—, —CO—O—, —O—CO—, —S— and/or —C≡C—,
$R^4$ is an alkyl group with up to 8 C atoms wherein one $CH_2$ group can be replaced by —O—, —CO—O— or —O—CO—,
$A^1$ and $A^2$ independently are an unsubstituted or mono- or polysubstituted 1,4-cyclohexylene group, wherein one or two non-adjacent $CH_2$ groups may be replaced by —O— and/or —S—, or denote a 1,4-bicyclo[2,2,2]octylene group, or a 1,4-phenylene group optionally substituted by fluorine, and wherein one or two CH groups may be replaced by N, X is CN, Cl, F, Br, CH₃ or CF₃, Y is H or CH₃, Z¹ denotes —CO—O—, —O—CO—, —CH₂CH₂—CHCN—CH₂—, —CH₂—CHCN—, —CH=CH—, —C≡C—, —OCH₂—, —CH₂O, —CH=N—, —N=CH—, —N=N—, —NO=N—, —N=NO— or a single bond, o is 1, 2, or 3, and is an alkylene or alkenylene group with 1 to 7 C atoms wherein one CH₂ group can be replaced by —O—, —CO—O—or —O—CO—, with the proviso that X, Y and R⁴ being different groups.

The invention relates furthermore to such a display element, characterized in that at least one component is a compound of the formula III

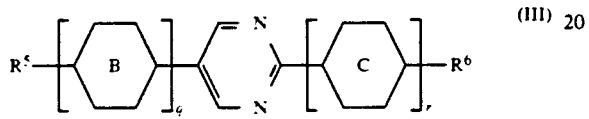  (III)

wherein

R⁵ and R⁶ are each independent an alkyl group with 5 to 15 C atoms wherein one or two CH₂ groups can also be replaced by —O—, —S— —CO—O—, —O—CO— and/or —CH=CH—

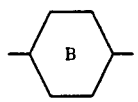

denotes a 1,4 phenylene group optionally substituted by fluorine,

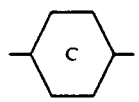

denotes a 1,4-phenylene group optionally substituted by fluorine or a trans-1,4-cyclohexylene group, q is 0 or 1, and r is 1 or 2, and at least one chiral component is a compound of the formula II wherein R³, R⁴, A¹, A², Y and Q have the meaning given.

In particular the invention relates to such a display element, characterized in that in formula I at least one group

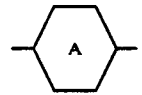

denotes a 1,4-phenylene group which is substituted by fluorine, and to such a display element, characterized in that R¹ and R² in formula I are each alkyl or alkoxy with 5 to 15 C atoms.

Furthermore the invention relates to such a display element characterized in that R⁵ and R⁶ in formula III are each alkyl or alkoxy with 5 to 15 C atoms.

Preferred display elements according to the invention are those in which the non-chiral base mixture comprises compounds of the formula I.

Particularly preferred compounds of the formula I are those of the part formulae Ia to Ik:

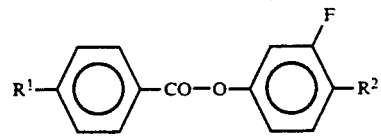 Ia

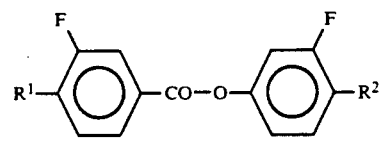 Ib

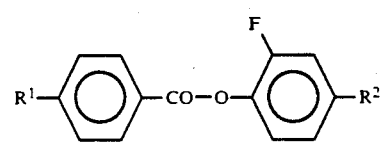 Ic

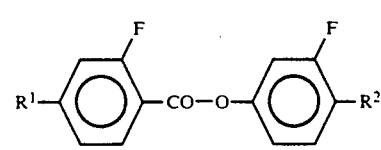 Id

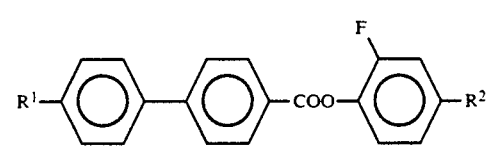 Ie

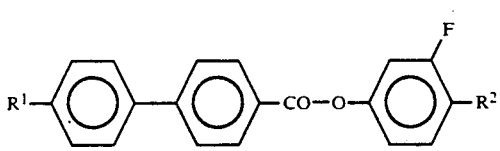 If

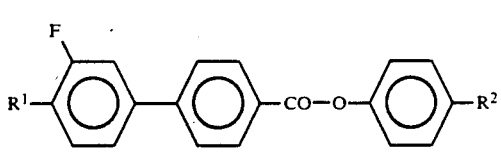 Ig

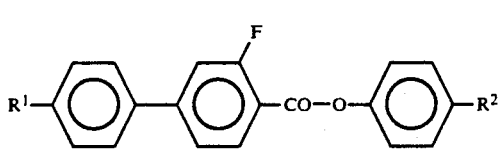 Ih

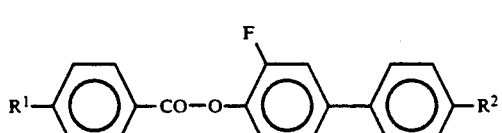 Ii

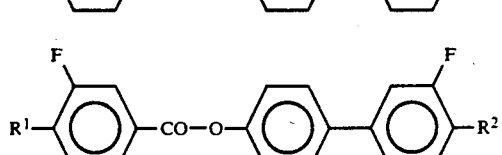 Ij

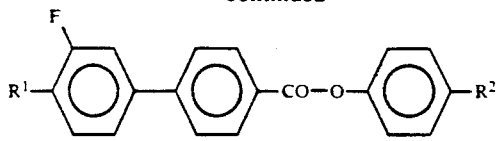

Particularly preferred display elements according to the invention are those in which the non-chiral base mixture comprises compounds of the formula III. Preferred compounds of the formula III are those of the part formulae IIIa to IIIi:

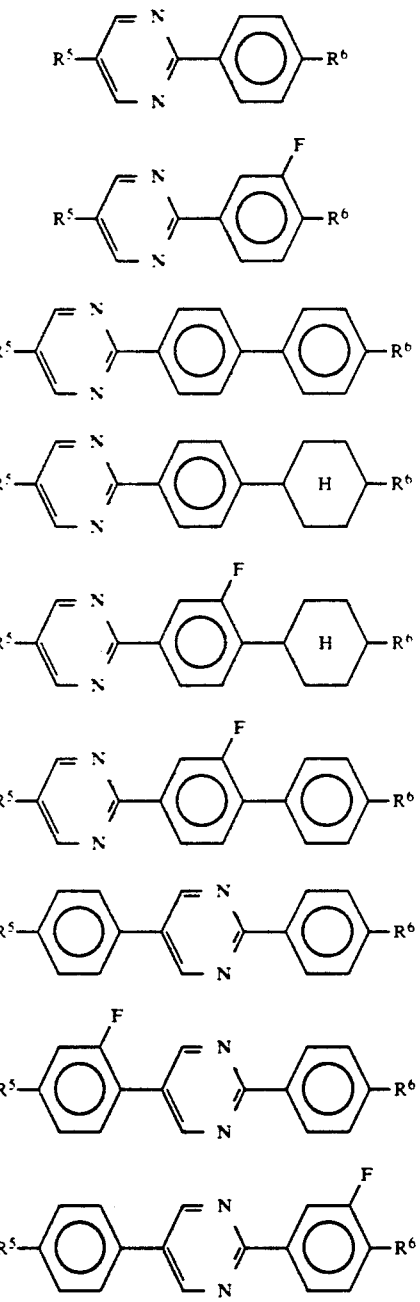

Particularly preferred display elements according to the invention are those in which the both chiral components are of the formula II. Preferred compounds of the formula II are those of the part formulae IIa to IIf:

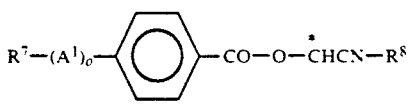

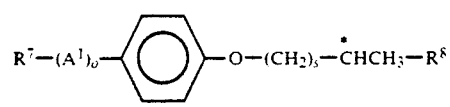

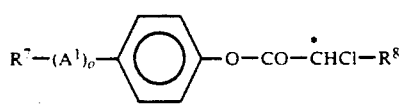

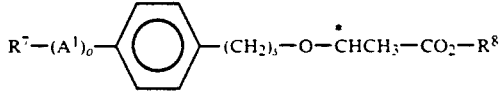

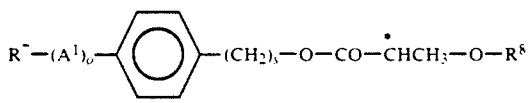

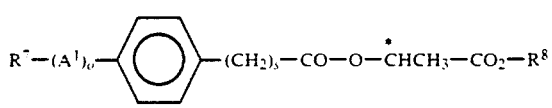

wherein $R^7$ is alkyl or alkoxy with 5 to 15 C atoms, $R^8$ is alkyl with 1 to 8 C atoms, 0 is 1 or 2, s is 0 or an integer value between 1 and 6 and $A^1$ is preferably 1,4-phenylene, pyridine-2,5-diyl pyrimidine-2,5-diyl, 2-fluoro-1,4-phenylene or trans-1,4-cyclohexylene. $R^1$ and $R^2$ (in the compounds of the formula I) and $R^5$ and $R^6$ (in the compounds of the formula III) independently of one another are each preferably alkyl, alkoxy, alkanoyl, alkanoyloxy, alkoxycarbonyl or alkoxycarbonyloxy, each preferably having 5 to 12, in particular 6 to 10, C atoms. Alkyl and alkoxy are particularly preferred. A particularly preferred combination in the compounds of the formula I is one in which $R^1$ is alkoxy and $R^2$ is alkyl. A particularly preferred combination in the compounds of the formula III is one in which $R^5$ is alkyl and $R^6$ is alkoxy. $R^1$ and $R^2$ groups with a straight-chain alkyl radical are particularly preferred.

Particularly preferred display elements according to the invention are those in which the achiral base mixture contains, in addition to compounds of the formula I or III, at least one other component with a negative or comparatively low positive dielectric anisotropy. This/these other component(s) of the achiral base mixture can make up 1 to 95%, preferably 5 to 40, of the base mixture. Suitable further components with a comparatively low positive or negative dielectric anisotropy are compounds of the formulae IV to VII.

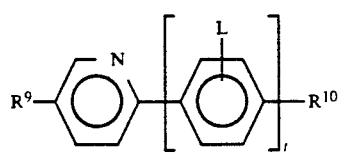

-continued

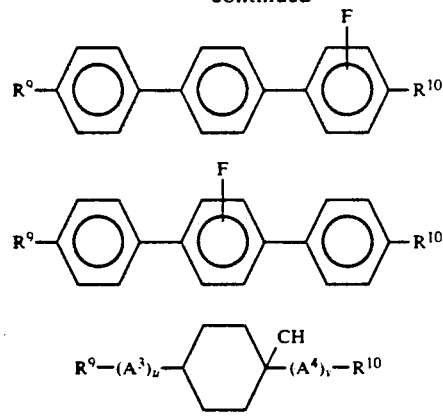

wherein $R^9$ and $R^{10}$ are each alkyl or alkoxy with 5 or 15 C atoms, L is hydrogen or fluorine, $A^3$ and $A^4$ each independently are 1,4-phenylene or trans-1,4-cyclohexylene, u and v are each independently 0, 1 or 2, the sum of u+v is 1 or 2 and t is 1 or 2.

All components of the phases according to the invention are either known or can be prepared in a manner known per se, analogously to known compounds.

Esters of the formula I can be obtained by esterification of corresponding carboxylic acids (or their reactive derivatives) with phenols (or their reactive derivatives).

The corresponding carboxylic acids and phenols are known or can be prepared by processes analogous to known processes.

Particularly suitable reactive derivatives of the carboxylic acids mentioned are the acid halides, above all the chlorides and bromides, and furthermore the anhydrides, for example also mixed anhydrides, azides or esters, in particular alkyl esters with 1-4 C atoms in the alkyl group.

Possible reactive derivatives of the alcohols or phenols mentioned are, in particular, the corresponding metal phenolates, preferably of an alkali metal, such as sodium or potassium.

The esterification is advantageously carried out in the presence of an inert solvent. Particularly suitable solvents are esters, such as diethyl ether, di-n-butyl ether, THF, dioxane or anisole, ketones, such as acetone, butanone or cyclohexanone, amides, such as dimethylformamide or phosphoric acid hexamethyltriamide, hydrocarbons, such as benzene, toluene or xylene, halogenohydrocarbons, such as dichloromethane carbon tetrachloride or tetrachloroethylene, and sulfoxides, such as dimethylsulfoxide or sulfolane. Water-immiscible solvents can simultaneously be advantageously used for azeotropic distillation of the water formed during the esterification. An excess of an organic base, for example pyridine, quinoline or triethylamine, can occasionally also be used as the solvent for the esterificaton. The esterification can also be carried out in the absence of a solvent, for example by heating the components in the presence of sodium acetate. The reaction temperature is usually between $-50°$ and $+250°$, preferably between $-20°$ and $+80°$. At these temperatures, the esterification reactions have as a rule ended after 15 minutes to 48 hours.

In detail, the reaction conditions for the esterification depend largely on the nature of the starting substances used. Thus, a free carboxylic acid is as a rule reacted with a free alcohol or phenol in the presence of a strong acid, for example a mineral acid, such as hydrochloric acid or sulfuric acid. A preferred reaction procedure is the reaction of an acid anhydride or, in particular, an acid chloride with an alcohol, preferably in a basic medium, bases which are of importance being, in particular, alkali metal hydroxides, such as sodium hydroxide or potassium hydroxide, alkali metal carbonates or bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline. Another preferred embodiment of the esterification comprises first converting the alcohol or phenol into the sodium alcoholate or phenolate or potassium alcoholate or phenolate, for example by treatment with ethanolic sodium hydroxide solution or potassium hydroxide solution, isolating this product and suspending it in acetone or diethyl ether, together with sodium bicarbonate or potassium carbonate, with stirring, and adding a solution of the acid chloride or anhydride in diethyl ether, acetone or dimethylformamide to this suspension, advantageously at temperatures between about $-25°$ and $+20°$.

A further preferred reaction procedure is the reaction of an acid with an alcohol in an inert solvent in the presence of a water binding material, e.g. molecular sieves or carbodiimides, preferably dicyclohexylcarbodiimide (DCC).

The phases according to the invention are prepared in a manner which is customary, for example by mixing the components together, preferably at elevated temperatures.

The liquid crystal phases according to the invention can be modified by suitable additives so that they can be used in all the types of liquid crystal display elements hitherto disclosed.

The geometry of the display according to the invention is, for example, that described by Anderson et al. (Appl. Phys. Lett. 51, 640 (1987); European Patent Application 0 263 225).

The following examples are intended to illustrate the invention without limiting it. Percentages above and below are percentages by weight; all the temperatures are stated in degrees Celsius. The values given for spontaneous polarization are applicable to room temperature. The symbols are furthermore as follows: Cr: crystalline solid state, S: smectic phase (the index characterizes the phase type), N: nematic state, Ch: cholesteric phase, I: isotropic phase. The figure between two symbols indicates the transition temperature in degrees Celsius.

EXAMPLES

Example 1

A liquid crystal medium consisting of 20.3% of 4-pentyl-2-fluorophenyl 4'-octyloxybiphenyl-4-ylcarboxylate 20.3% of 4-heptyl-2-fluorophenyl 4'-heptyloxybiphenyl-4-ylcarboxylate 20.3% of 4-heptyl-2-fluorophenyl 4'-octyloxy-3'-fluorobiphenyl-4-ylcarboxylate 16% of 4-pentyl-2-fluorophenyl 4'-octyloxybenzolate 16% of optically active 1-cyano-3-methylpropyl 4'-octyloxy-3'-fluorobiphenyl-4-ylcarboxylate and 7% of optically active 1-cyanoethyl 4'-octyloxy-3'-fluorobiphenyl-4-ylcarboxylate exhibits $S_c^*$ 28° $S_A$ 73° Ch 89-92° I, a significant field induced tilt angle in the smectic A phase and a helix compensated cholesteric phase. Due to this feature this medium can be readily aligned to produce a good alignment of the smectic A phase.

The following tables illustrate the effect of applying a dc field to this liquid crystal medium aligned with rubbed polyamide and contained in a 2,4 μm thick cell.

| TILT ANGLE vs TEMPERATURE at 20 v/μm | |
|---|---|
| Temperature (°C.) | Tilt Angle (°) |
| 29 | 14 |
| 30 | 13 |
| 33 | 11.5 |
| 38 | 9 |
| 40 | 7 |
| 43 | 6 |
| 48 | 5.5 |
| 53 | 5 |

| TILT ANGLE (°) vs APPLIED FIELD at Various Temperatures | | | | | |
|---|---|---|---|---|---|
| | Temperature (°C.) | | | | |
| Field (v/μm) | 29 | 31 | 33 | 38 | 46 |
| 5 | 8 | 7 | 6.5 | 3 | 1.5 |
| 10 | 10.5 | 9 | 8.5 | 5 | 2.5 |
| 15 | 12 | 11 | 10 | 6.5 | 4 |
| 20 | 14 | 12.5 | 11.5 | 9 | 5 |
| 25 | 13 | 12 | 10.5 | 10 | 6 |

EXAMPLE 2

A liquid crystal medium consisting of
3.9% of 2-p-hexyloxyphenyl-5-heptylpyrimidine
3.9% of 2-p-heptyloxyphenyl-5-heptylpyrimidine
3.9% of 2-p-octyloxyphenyl-5-heptylpyrimidine
3.9% of 2-p-nonyloxyphenyl-5-heptylpyrimidine
24.0% of 2-p-heptyloxyphenyl-5-hexylpyrimidine
2.0% of 2-p-hexyloxyphenyl-5-nonylpyrimidine
26.0% of 2-p-nonyloxyphenyl-5-nonylpyrimidine
9.8% of r-1-cyano-cia-4-(trans-4-pentylcyclohexyl)-1-(trans-4-pentylcyclohexyl)-cyclohexane
2.6% of optically active 2-(4-(3,7-dimethyloctyloxy)-phenyl)-5-nonylpyrimidine and
20% of optically active 4-(5-heptylpyrimidine-2-yl)-phenyl 2-chloro-4-methylbutyrate)
exhibits C $-20°$ $S_A$ 62° CH 66° I and a cholesteric pitch of $-14$ μm at 63° C.

EXAMPLE 3

A liquid crystal medium consisting of
17% of 4-pentyl-2-fluorophenyl 4'-octyloxybiphenyl-4yl-carboxylate
17% of 4-heptyl-2-fluorophenyl 4'-heptyloxybiphenyl-4-yl-carboxylate
17% of 4-heptyl-2-fluorophenyl 4'-octyloxy-3'-fluorobiphenyl-4-yl carboxylate
16% of 4-pentyl-2-fluorophhenyl-4'-octyloxybenzoate
10% of 4-pentylphenyl 4'-heptylbenzoate
16% of optically active 1-cyano-3-methylpropyl 4'-octyl-oxy-3'-fluorobiphenyl-4-yl carboxylate and
7% of optically active 1-cyanoethyl 4'-octyloxy-3'-fluorobiphenyl 4-yl carboxylate
exhibits $S^*_c$ $-1.6°$ $A_4$ 60° Ch 75.7° I, a significant field induced tilt angle in the smectic A phase and a helix compensated cholesteric phase.

The following table illustrates the effect of applying a dc field to this liquid crystal medium:

| Induced Tilt Angle at 20° C. | |
|---|---|
| Field (V/μm) | Induced Tilt (°) |
| 5 | 2 |
| 10 | 4 |
| 15 | 6 |
| 20 | 8 |
| 25 | 9 |

EXAMPLE 4

A liquid crystal medium consisting of
13.19% of 4-n-octyloxy-2'-fluoro-4"-n-pentyl-p-terphenyl
13.23% of 4-n-pentyloxy-2'-fluoro-4"-(4methylhexyl)-p-terphenyl
13.17% of 4-n-heptyloxy-2'-fluoro-4"-(4-methylhexyl)-p-terphenyl
15.47% of 4n-heptylphenyl 4'-pentylbenzoate
14.99% of 4-octyloxy-3-fluorophenyl 4'-octyloxybenzoate
4.98% of optically active 1-cyano-3-methylpropyl 4'-octyl-oxy-3'-fluoro biphenyl-4-yl carboxylate
9.86% of optically active 1-cyanoethyl 4'-octyloxy-3'-fluoro biphenyl-4-yl-carboxylate
exhibits $S^*_C$ 23.6° $S_A$ 52.6° Ch 71.7° I.

What is claimed is:

1. In an electroclinic effect display element containing a liquid crystal medium, the improvement wherein:
said medium is a mixture of at least two chiral components and at least one non-chiral component, said medium has a compensated cholesteric phase above an optically active smectic A phase, wherein said medium is capable of exhibiting an electroclinic effect, and
wherein said at least one non-chiral component is a compound of formula I

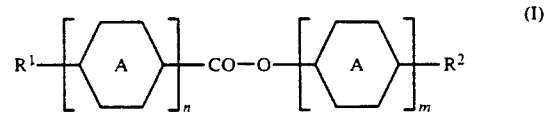

wherein
$R^1$ and $R^2$ are each independently an alkyl group with 5 to 15 C atoms wherein one or two non-adjacent $CH_2$ groups can also be replaced by —O—, —S—, —CO—O—, —O—CO— and/or —CH=CH,

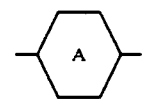

is a 1,4-phenylene group optionally substituted by fluorine wherein in Formula I, at least one group

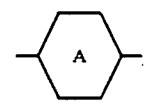

is a 1,4-phenylene group which is substituted by fluorine, and
n and m are each independently 1 or 2, and at least one of said chiral components is a compound of formula II

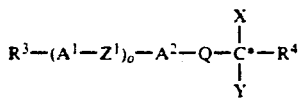  (II)

wherein
- $R^3$ is an alkyl or alkenyl group each with 5 to 15 C atoms, optionally substituted by CN or at least one halogen atom wherein one or two non-adjacent $CH_2$ groups can be replaced by —O—, —CO—, —CO—O—, —O—CO—, —S— and/or —C≡C—,
- $R^4$ is an alkyl group with up to 8 C atoms wherein one $CH_2$ group can be replaced by —O—, —CO—O— or —O—CO—,
- $A^1$ and $A^2$ are independently each an unsubstituted or mono- or polysubstituted 1,4-cyclohexylene group wherein one or two non-adjacent $CH_2$ groups may be replaced by —O— and/or —S—, a 1,4-bicyclo[2.2.2]octylene group, or a 1,4-phenylene group optionally substituted by fluorine, and wherein one or two CH groups may be replaced by N,
- X is CN, Cl, F, Br, $CH_3$ or $CF_3$,
- Y is H or $CH_3$,
- $Z^1$ is —CO—O—, —O—CO—, —$CH_2CH_2$—, —CHCN—$CH_2$—, —$CH_2$—CHCN—, —CH=CH—, —C≡C—, —$OCH_2$—, —$CH_2O$—, —CH=N—, —N=CH—, —N=N—, —N=NO— or a single bond.
- is 1, 2, or 3, and
- is an alkylene or alkenylene group with 1 to 7 C atoms wherein one $CH_2$ group can be replaced by —O—, —CO—O— or —O—CO—, with the proviso that X, Y and $R^4$ are different groups.

2. A display element according to claim 1, wherein at least one component is a compound of the formula III

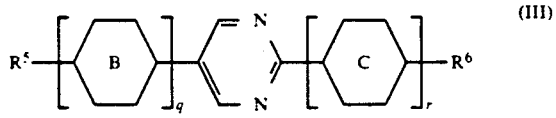  (III)

wherein
- $R^5$ and $R^6$ are each independently an alkyl group with 5 to 15 C atoms wherein one or two $CH_2$ groups can also be replaced by —O—, —S—, —CO—O—, —O—CO— and/or —CH=CH—,

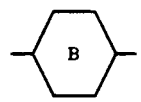

denotes a 1,4-phenylene group optionally substituted by fluorine,

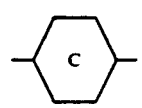

denotes a 1,4-phenylene group optionally substituted by fluorine or a trans-1,4-cyclohexylene group, q is 0 or 1, and
r is 1 or 2,
and
said at least one chiral component is a compound of the formula II wherein

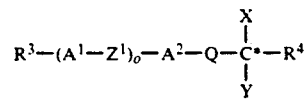  (II)

- $R^3$ is an alkyl or alkenyl group each with 5 to 15 C atoms, optionally substituted by CN or at least one halogen atom wherein one or two nonadjacent $CH_2$ groups can be replaced by —O—, —CO—, —CO—O—, —O—CO—, —S— and/or —C≡C—,
- $R^4$ is an alkyl group with up to 8 C atoms wherein one $CH_2$ group can be replaced by —O—, —CO—O—or —O—CO,
- $A^1$ and $A^2$ independently are an unsubstituted or mono—or polysubstituted 1,4-cyclohexylene group, wherein one or two non-adjacent $CH_2$ groups may be replaced by —O— and/or —S—, or denote a 1,4-bicyclo octylene group, or a 1,4-phenylene group optionally substituted by fluorine, and wherein one or two CH groups may be replaced by N,
- X is CN, Cl, F, Br, $CH_3$ or $CF_3$,
- Y is H or $CH_3$,
- $Z^1$ denotes —CO—O—, —O—CO—, —$CH_2CH_2$—, —CHCN—$CH_2$—, —$CH_2$—CHCN—, —CH=CH—, —C≡C—, —$OCH_2$—, —$CH_2O$, —CH=N—, —N=CH—, —N=N, —NO=N—, —=NO— or a single bond,
- o is 1, 2, or 3, and
- O is an alkylene or alkenylene group with 1 to 7 C atoms wherein one $CH_2$ group can be replaced by —O—, —CO—O or —O—CO—, with the proviso that X, Y and $R^4$ are different groups.

3. A display element according to claim 1 wherein $R^1$ and $R^2$ in formula I are each alkyl or alkoxy with 5 to 15 C atoms.

4. A display element according to claim 2, wherein $R^5$ and $R^6$ in formula III are each alkyl or alkoxy with 5 to 15 C atoms.

5. A display element according to claim 1, wherein both said at least two chiral components are compounds according to Formula II.

6. A display element according to claim 2, wherein both said at least two chiral components are compounds according to Formula II.

7. A display element according to claim 1, wherein said chiral compound according to Formula II is of Formulae IIa-IIf

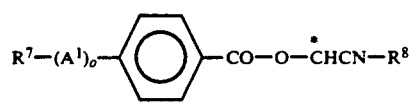  IIa

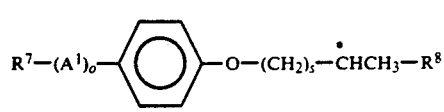  IIb

-continued

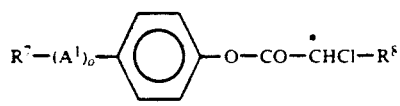  IIc

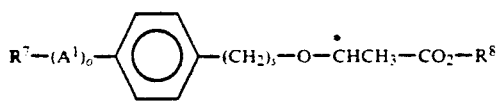  IId

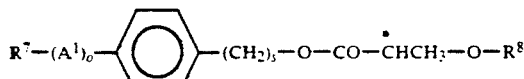  IIe

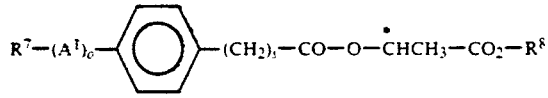  IIf wherein
$R^7$ is alkyl or alkoxy with 5 to 15 C atoms,
$R^8$ is alkyl with 1 to 8 C atoms,
o is 1 or 2,
s is 0 or an integer value between 1 and 6, and is preferably 1,4-phenylene, pyridine-2,5-diyl pyrimidine-2,5-diyl, 2-fluoro-1,4-phenylene or trans-1,4-cyclohexylene.

8. A display element according to claim 2, wherein said chiral compound according to Formula II is of Formulae IIa–IIf

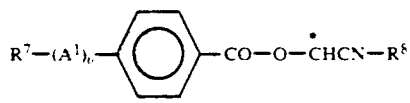  IIa

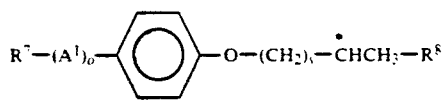  IIb

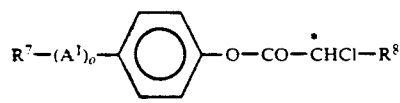  IIc

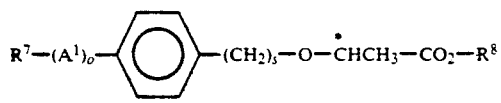  IId

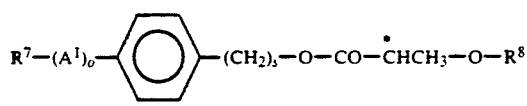  IIe

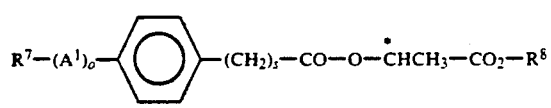  IIf wherein
$R^7$ is alkyl or alkoxy with 5 to 15 C atoms,
$R^8$ is alkyl with 1 to 8 C atoms,
o is 1 or 2,
s is 0 or an integer value between 1 and 6, and is preferably 1,4-phenylene, pyridine-2,5-diyl pyrimidine-2,5-diyl, 2-fluoro-1,4-phenylene or trans-1,4-cyclohexylene.

9. A display element according to claim 1, wherein said liquid crystal mixture further contains at least one

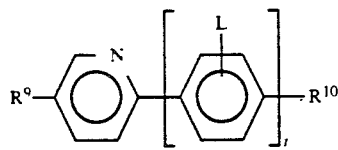  IV

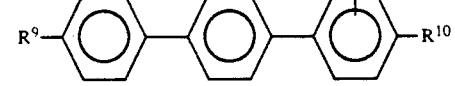  V

  VI

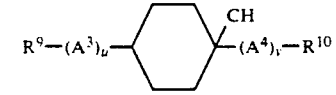  VII wherein
$R^9$ and $R^{10}$ are each alkyl or alkoxy with 5 or 15 C atoms,
L is hydrogen or fluorine,
$A^3$ and $A^4$ each independently are 1,4-phenylene or trans-1,4-cyclohexylene,
u and v are each independently 0, 1 or 2, the sum of u+v being 1 or 2, and
t is 1 or 2.

10. A display element according to claim 2, wherein said liquid crystal mixture further contains at least one

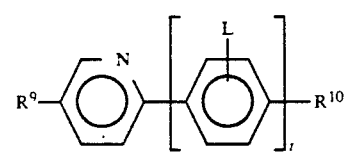  IV

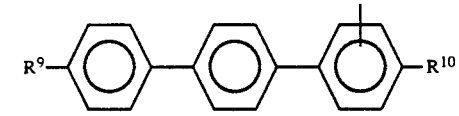  V

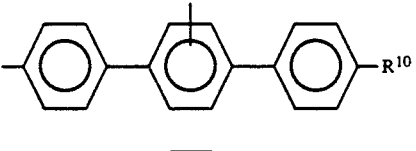  VI

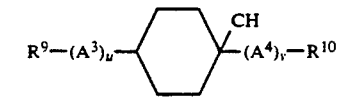  VII wherein
$R^9$ and $R^{10}$ are each alkyl or alkoxy with 5 or 15 C atoms, L is hydrogen or fluorine,
$A^3$ and $A^4$ each independently are 1,4-phenylene or trans-1,4-cyclohexylene,
u and v are each independently 0, 1, or 2, the sum of is 1 or 2.

11. A display element according to claim 1, wherein said liquid crystal medium contains 4-pentyl-2-fluorophenyl-44- -octyloxybiphenyl-4-yl-carboxylate; 1-cyano-3-methylpropyl-4'-octyloxy-3'-fluorobiphenyl-4-ylcarboxylate; and 2-p-hexyloxyphenyl-5-heptyl-pyrimidine.

* * * * *

UNITED STATES PATENT AND TRADEMARK OFFICE
CERTIFICATE OF CORRECTION

PATENT NO. : 5,116,527
DATED : May 26, 1992
INVENTOR(S) : David COATES et al,

It is certified that error appears in the above-identified patent and that said Letters Patent is hereby corrected as shown below:

CLAIM 1; Col. 11; Line 33 - - -

Reads - - - is 1,2, or 3, and

Should read --- "O is 1,2 or 3, and Q "

CLAIM 10: Col. 15; Line 4 - - -

After $\underline{of}$ insert " u + v being 1 or 2, and t "

CLAIM 11: Col. 16 Line 2 - - -

Reads fluorophenyl-44 - - - -

Should read fluorophenyl-4'

CLAIM 11; Line 4.- - - -

Change 4-ylcarboxylate to read 4-yl-carboxylate

Signed and Sealed this

Ninth Day of November, 1993

Attest:

BRUCE LEHMAN

Attesting Officer     *Commissioner of Patents and Trademarks*